Figure 1:
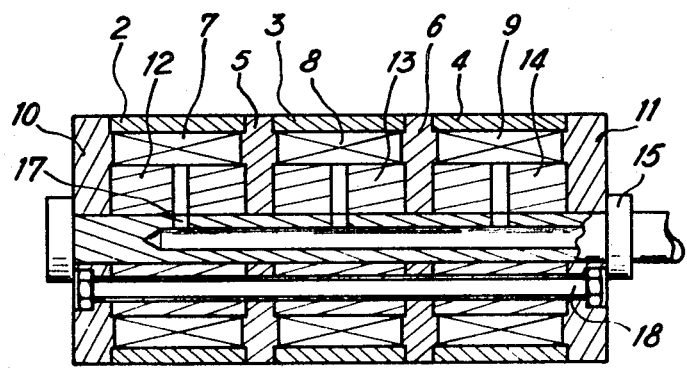

United States Patent

[11] 3,610,402

| [72] | Inventors | Georges Louis Pierre Tavernier<br>Nord;<br>Robert Lucien Dubois, Maubeuge, both of<br>France |
|---|---|---|
| [21] | Appl. No. | 793,081 |
| [22] | Filed | Jan. 22, 1969 |
| [45] | Patented | Oct. 5, 1971 |
| [73] | Assignee | Usinor<br>Paris, France |
| [32] | Priority | Jan. 22, 1968 |
| [33] | | France |
| [31] | | 136,931 |

[54] ROLL FOR DISPLACEMENT OF BARLIKE PRODUCTS
2 Claims, 2 Drawing Figs.

[52] U.S. Cl. .................................................... 198/41,
198/127, 226/93
[51] Int. Cl. ........................................................ B65g 17/46
[50] Field of Search............................................. 226/93;
271/74.1; 198/41, 127; 335/288, 289, 291

[56] References Cited
UNITED STATES PATENTS

| 2,217,075 | 10/1940 | O'Malley...................... | 198/127 |
| 2,953,369 | 9/1960 | Goldberg et al. ............. | 226/93 |
| 3,129,805 | 4/1964 | Krahn et al. .................. | 198/127 |
| 3,433,398 | 3/1969 | Fadden et al. ................ | 226/93 |

FOREIGN PATENTS

| 1,052,899 | 3/1959 | Germany...................... | 198/127 |
| 1,083,252 | 9/1967 | Great Britain................ | 198/127 |
| 1,157,120 | 7/1969 | Great Britain................ | 226/93 |

Primary Examiner—Evon C. Blunk
Assistant Examiner—Hadd S. Lane
Attorney—Breitenfeld and Levine ABSTRACT: Roll for transporting rolled steel products comprises rings of ferromagnetic material separated by rings of nonmagnetic material. All rings have same diameter but nonmagnetic rings are narrower than magnetic rings. Annular coil within each magnetic ring supplied with DC power to magnetize ferromagnetic rings. Entire assembly mounted on rotatable shaft. Apparatus may comprise plurality of such rolls on parallel shafts with idler rolls between them, nonmagnetic rings of the rolls being out of alignment.

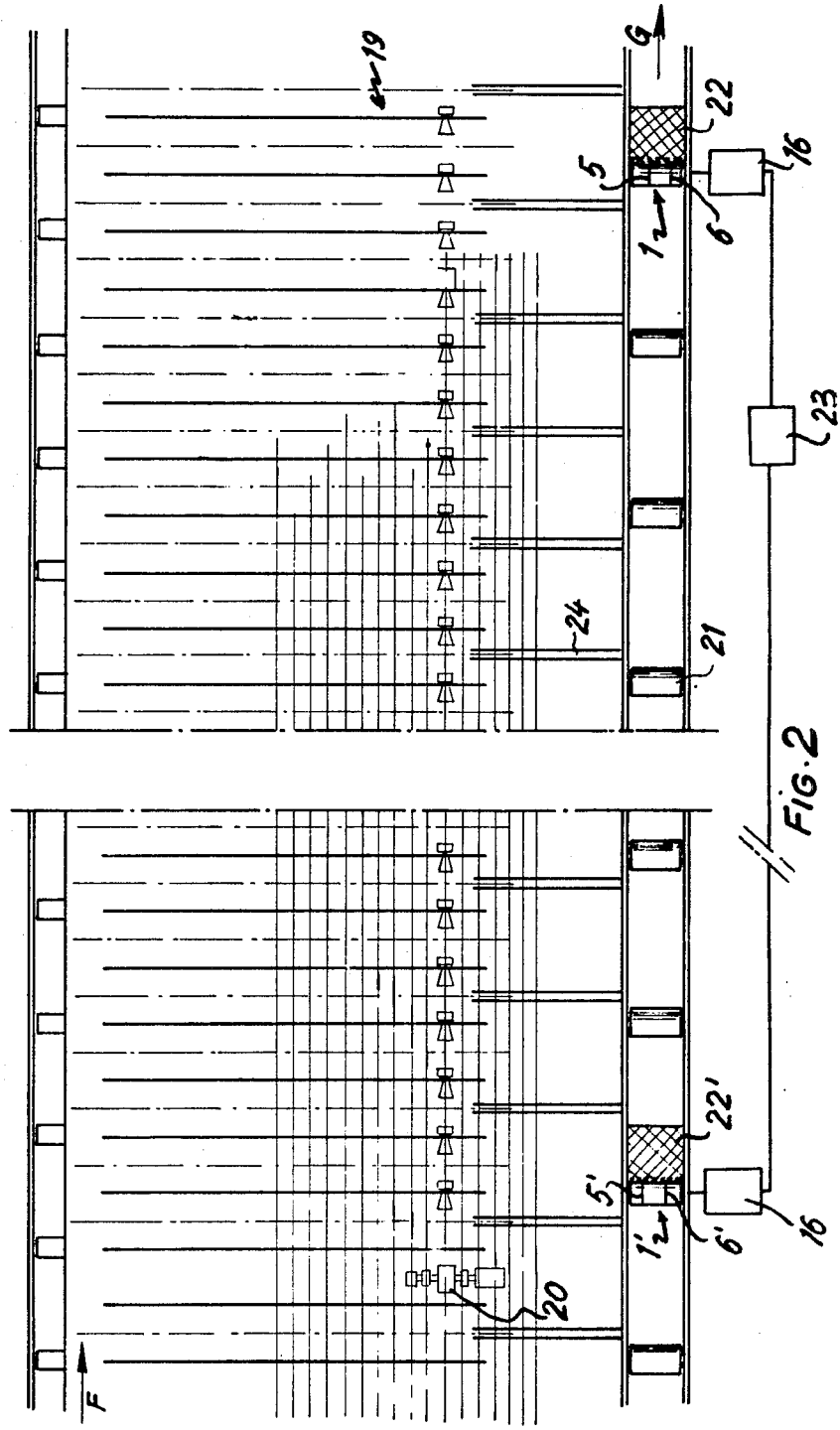

ROLL FOR DISPLACEMENT OF BARLIKE PRODUCTS

The present invention relates to a roll whereby the movement of ferromagnetic barlike products, lying side by side and forming a layer or a nap, can be effected in a longitudinal direction. The invention has particular but not exclusive reference to rolled steel products such as bars, and angles.

Until now, in order to effect transport of products of this type, particularly when a number of the latter are massed together in the form of a layer, motorized rolls have been used, these rolls being smooth cylinders bringing about the displacement of the products by friction. The lighter the products are, the less efficient are these motorized rolls and due to this fact have a lesser coefficient of adhesion so that a large number of them are necessary for permitting satisfactory transport. For example, with products 90 meters long, a roll is required every meter. This results in an unduly high initial cost and maintenance cost in relation to the power which is actually necessary.

Where the term "layer" is used in this specification and claims it is to be understood as a parallel grouping or accumulation of bars or angles, such as are caused to move from the cooling bed to the transporting rolls in the customary manner.

On the other hand, it has been proposed to effect the movement of steel products with the aid of permanently magnetized rolls, but this solution causes operating difficulties which render it impractical, particularly in the case of products massed in the form of a layer.

In French Pat. Application No. PV 78436 of Sept. 30, 1966, now French Pat. No. 1,547,377, the applicants have proposed effecting the conveyance of products by means of a roll of ferromagnetic material adapted to be rotated by a motor and equipped with a magnetizing coil which can be supplied with direct electric current. In the embodiment described, the roll is formed by two adjacent steel bodies connected mechanically but isolated magnetically with, at the junction of the two bodies, a groove intended to receive the product. A transporter of this type is entirely satisfactory in the case of an individual product. However, the application to the case of products massed in the form of a layer raises difficulties which are obviated or mitigated by the present invention.

According to the present invention there is provided a roll for the transport of ferromagnetic barlike products lying side by side and forming a layer or a nap, said roll being provided on its surface with areas of ferromagnetic material separated by areas of nonmagnetic material of less surface area then the areas of ferromagnetic material. The roll is also provided with magnetizing coils in its interior in the vicinity of the ferromagnetic areas, the coils being supplied with direct electric current. Means are provided for rotating the roll.

According to a further aspect of the present invention an installation for transporting elongated barlike products of ferromagnetic material lying side by side to form a layer or nap, comprises at least two rolls, each roll being provided on its surface with areas of ferromagnetic material separated by areas of nonmagnetic material of less surface area than the areas of ferromagnetic material. Each roll is also provided with magnetizing coils in its interior in the vicinity of the ferromagnetic areas, the coils being supplied with direct electric current. Means are provided for rotating each roll.

Preferably, the roll in accordance with the invention comprises rings of ferromagnetic material separated by rings of nonmagnetic material, the latter rings having the same outer diameter, but lesser width than, the ferromagnetic rings. Annular magnetizing coils are arranged in the ferromagnetic rings, and the assembly is mounted on a common shaft which is adapted to be rotated. Preferably the common shaft is hollow for the passage of the wires supplying the direct electric current for the coils.

In order to obtain the best results, the reluctance of the magnetic circuit is adjusted to establish a uniform attraction force on the generatrix of the roll to facilitate the transport of products of nominal minimum section in the form of a layer, and to avoid the products piling up in several layers or forming a bundle.

It is a surprising fact that it is sufficient to excite the coils during the course of rotation in order to be able to carry along products in the form of a layer, even of very great length, without them slipping. In particular, the products cooperate with each other, by contact, in order to ensure the completion of the magnetic field circuit so that they are all attracted by the roll which they contact with an adequate force. Even an individual product placed on a nonmagnetic area assumes an unstable position and tends to slide towards a ferromagnetic area.

Moreover, when the coils are not supplied with current, the layer of products may be easily shifted on the roll. Finally, by studying the magnetic spectrum, it can be shown that the field is not disturbed by the presence of metallic plates adjacent to each roll, or between the rolls, functioning both as a frame and as a component which serves to disengage the ends of products from the roll.

Due to the high attractive force of an electromagnetic roll according to the invention, it is possible, in a given installation, to considerably reduce the number of transporters, in relation to that necessary when conventional motorized rolls are used. The result of this is a considerable saving in the initial, and maintenance, cost of the installation.

A conveyor according to the invention is particularly advantageous when it is employed to move products which are side by side and parallel to each other, in a longitudinal direction. Since the products are attracted to the roll and do not slide with respect to it, they remain side by side and none moves ahead of the others.

The invention will now be described, by way of example, with reference to the accompanying drawings, in which:

FIG. 1 is a sectional view along the longitudinal axis of a roll according to this invention, and FIG. 2 shows diagrammatically in plan view an installation comprising rolls according to FIG. 1.

A roll according to the invention for the transport of ferromagnetic products in the form of a layer is a smooth cylinder indicated generally by the reference numeral 1. The surface of the roll comprises areas of ferromagnetic material separated by areas of nonmagnetic material. In the embodiment shown these areas are formed by steel rings 2, 3, and 4 separated by rings 5 and 6 of lesser width, but of the same diameter as the rings 2, 3, and 4. The rings 5 and 6 are of nonmagnetic material and in order that the wear of the roll surface is uniform, these rings can be made of nonmagnetic steel of any type having substantially the same wear resistance as the magnetic material of rings 2, 3, and 4.

Annular magnetizing coils 7, 8, and 9 are arranged in the ferromagnetic rings 2, 3, and 4. The assembly is completed by end flanges 10 and 11 and coil-supporting cores 12, 13, and 14 and is mounted on a common shaft 15 which is rotated by means of a motor shown at 16 in FIG. 2. The shaft 15, of nonmagnetic steel, is hollow and is formed with lateral openings 17 accommodating electric wires supplying the coils with direct current.

The interlocking of all the parts provided on the shaft 15 is effected by tie rods 18, for example three in number.

The coils are so designed, and the energizing current selected, to avoid overheating. The number of coils may be odd or even.

In FIG. 2 there is shown an installation for the transport of layers of products, for example, for the transfer, toward a shear, of products coming from a cooling bed 19 of substantial length equipped with an alignment roll 20, such as described in the aforementioned French Pat. No. 1,547,377. It comprises at least two electromagnetic rolls 1 and 1' according to the present invention, between which are provided idler rolls 21 having their axes parallel to the shafts of the rolls 1 and 1'. Preferably the nonmagnetic areas 5 and 6 of 1 are not in alignment with the nonmagnetic areas 5' and 6' of roll 1' so that a product is necessarily in contact with a ferromagnetic area on one or the other of the rolls. Consequently, every product is attracted to at least one of the rolls. Moreover, metallic plates 22 and 22' located at a slightly lower level than the upper generatrices of the rolls 1 and 1', are provided adjacent to each of the said rolls and downstream in relation to the direction of displacement G of the products. A single manual or automatic control 23 can be operated to simultaneously effect the rotation of all the electromagnetic rolls through the intermediary of motors 16, and also the excitation of the coils with which these rolls are equipped.

The elongated products are slid one by one onto the transporter by means of suitable devices 24. When the number of products arranged on the rolls 1, 1', and 21 forms a layer of desired quantity the control 23 successively ensures the rotation of the electromagnetic rolls 1 and 1' and the attraction of the products on these rolls, in such manner that the said products are carried along without slipping and are advanced over the idler rolls 21.

If the ends of the products are all aligned, they remain aligned in the course of their parallel movement. This is an advantage when, for example, the products are moving toward a shear, since this reduces the losses in material and as a result lessens the waste.

As an example, it may e indicated that with a cooling bed 90 meters long it is sufficient to use four magnetic rolls according to the invention with 60 idler rolls for displacing layers of mild steel bars 90 meters long at 2.5 meters per second. Each layer may for example comprise 17 angles of 25 mm. or 13 angles of 40 mm. or 60 rounds of 12 mm. or 38 rounds of 25 mm.

Each magnetic roll in this example has a generatrix of 1,000 mm. length and a diameter of 260 mm. It comprises 9 magnetic parts and 8 nonmagnetic parts and is provided with a speed reducer and a motor.

For a conventional installation as heretofore in use with the same hourly capacity, 64 individually motorized rolls would be necessary, the individual power of the control motors being 2kw., whereas the magnetic rolls according to this invention each require 9kw., with in addition 800 watts per roll in order to provide the magnetic force.

Thus, with equipment according to this invention, the total power is equal to $4 \times 9 + 4 \times 0.8 = 39.2$kw., whereas with the standard equipment the total power would be $64 \times 2 = 128$kw. The reduction of power for an installation with the same hourly capacity is therefore, according to this invention, 70 percent.

Similarly, taking into account the fact that a magnetic roll according to this invention has a weight of 350 kg. + 180 kg. for the reducer +250 kg. for the motor, and that an idler roll weighs 90 kg., the total weight according to this invention is 8.5 tons, whereas with standard equipment using motorized rolls of the same diameter and length, weighing 410 kg. including the motors, the total weight would be 26 tons, i.e., a reduction of approximately 67 percent.

It will be understood that the embodiments described have been given as examples and that they may have numerous modifications without departing from the scope of the present invention.

The embodiments of the invention in which an exclusive property or privilege is claimed are defined as follows:

1. An installation for simultaneously transporting a plurality of separate elongated ferromagnetic barlike products in a longitudinal direction while the products lie side by side forming a layer of nap, said installation comprising at least one roll having on its surface areas of ferromagnetic material separated by areas of nonmagnetic material, each of said areas of nonmagnetic material being substantial but having less surface area than each of said areas of ferromagnetic material, magnetizing coils in the interior of said roll in the vicinity of the ferromagnetic areas and magnetically coupled thereto, means for supplying said coils with direct current, means for positively rotating said roll to longitudinally advance the products engaging it, and a metallic plate adjacent to and downstream of said roll in relation to the direction of movement of the products, said plate being at a level slightly lower than that of the upper generatrix of said roll.

2. An installation for simultaneously transporting a plurality of separate elongated ferromagnetic barlike products in a longitudinal direction while the products lie side by side forming a layer of nap, said installation comprising at least two rolls each having on its surface areas of ferromagnetic material separated by areas of nonmagnetic material, each of said areas of nonmagnetic material being substantial but having less surface area than each of said areas of ferromagnetic material, magnetizing coils in the interior of each of said rolls in the vicinity of the ferromagnetic areas and magnetically coupled thereto, means for supplying said coils with direct current, and means for positively rotating said rolls to longitudinally advance the products engaging them, said rolls being rotatable about parallel axes and spaced apart a distance less than the length of the products being transported, and the magnetic areas of one roll being out of alignment with the magnetic areas of the other roll in a direction perpendicular to their axes of rotation.